May 13, 1952     R. L. WILLIAMS ET AL     2,596,455
AIRCRAFT FLIGHT REFUELING APPARATUS
Filed Dec. 30, 1949
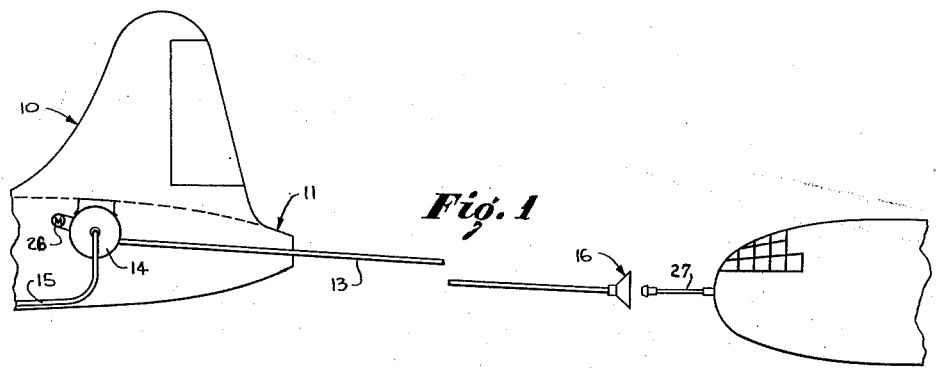
*Fig. 1*
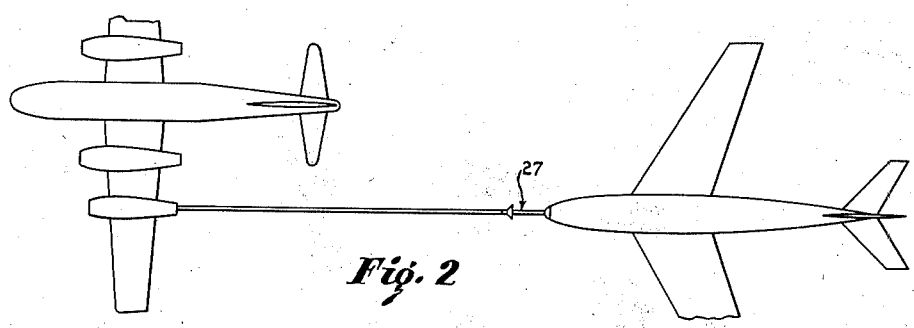
*Fig. 2*
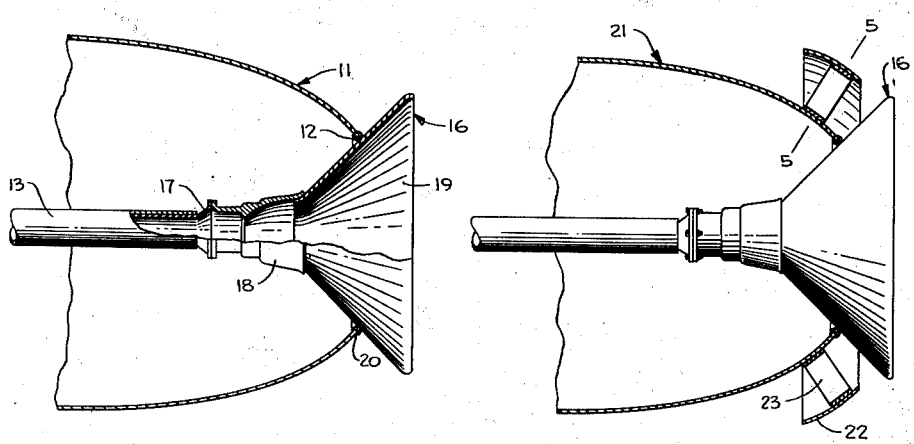
*Fig. 3*        *Fig. 4*
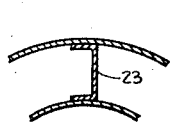    
*Fig. 5*     *Fig. 6*
ROBERT L. WILLIAMS
ALVIN FLOYD LAMMERS
HAROLD W. ZIPP
               Inventors
*Attorney*

Patented May 13, 1952

2,596,455

UNITED STATES PATENT OFFICE 2,596,455

AIRCRAFT FLIGHT REFUELING APPARATUS

Robert L. Williams, Alvin Floyd Lammers, and Harold W. Zipp, Wichita, Kans., assignors to Boeing Airplane Company, Wichita, Kans., a corporation of Delaware Application December 30, 1949, Serial No. 135,954

9 Claims. (Cl. 244—135)

This invention relates to apparatus for aiding in the transfer of fuel from a supply airplane to another airplane during flight.

It is a primary general object of the invention to provide an efficient means for utilizing the resistance of the air through which the supply airplane is flying, first, to move a length of fuel transfer conduit from its storage point inside the supply airplane into a trailing position behind the point of attachment of the conduit to the airplane, and second, to maintain the conduit in a relatively stationary trailing position with relation to the supply airplane to facilitate contact with the free end of the trailing conduit by a following airplane for effecting fuel transfer.

A specific object is to provide an air drag unit for attachment to the free end of a fuel transfer conduit for the purpose above described, together with a receiver or holder for the air drag unit when it is not in use.

It is a further object to provide a holder for the air drag unit which will facilitate its ejection into the air stream and away from the adjacent aircraft structure, thus greatly reducing possible damage to such structure.

The invention together with other objects attending its production will be more clearly understood when the following description is read in connection with the accompanying drawings, in which:

Fig. 1 is a schematic side view illustrating flight refueling apparatus embodying the invention, installed on a supply airplane, and illustrates the manner in which fuel may be transferred from one airplane to another, during flight;

Fig. 2 is a schematic top view illustrating a slightly different manner of installing the invention on a supply airplane;

Fig. 3 is a side view of an air drag cone and a fragmentary sectional view of a receiver embodying the invention, and shows details of construction;

Fig. 4 is a view similar to Fig. 3, and illustrates details in the construction of another type of cone receiver;

Fig. 5 is a sectional view taken along the line 5—5 of Fig. 4; and

Fig. 6 is a cross sectional view through a suitable combination sealing element and bumper for the cone receiver or holder.

Fig. 1 schematically illustrates one manner of installing the fuel transfer apparatus contemplated by this invention, together with the manner of using it to effect fuel transfer to a following airplane. The aft end of the supply airplane is designated as a whole by the numeral 10. The tail cone 11 may be of any cross sectional shape but is provided with a circular aperture 12 (Fig. 3) facing rearwardly.

The fuel transfer conduit is in the form of a flexible hose 13, one end of which is secured to a reel 14 suitably mounted inside the airplane. A fuel supply conduit 15 has one end in open but controllable communication with fuel supply tanks (not shown), carried by the supply airplane. The other end of the conduit 15 is in open communication with that end of the hose 13 which is secured to the reel 14. The free end of the hose 13 carries an air drag unit 16 which is frustoconical in shape and has an axial fuel transfer passage therethrough in open communication with the free end of the hose 13. Hereinafter the terms air drag unit and drag cone will be used synonymously. The drag cone includes an adapter 17, an automatic valve housing 18, and a flared metal skirt 19, all of circular cross section. The free end of the hose 13 is cemented onto a tubular neck of the adapter. The larger end of the cone is considerably larger in diameter than the aperture 12. The aperture thus serves as a receiver or holder for the cone when the hose is reeled in taut, and the cone serves as a closure for the aperture, as clearly shown in Figs. 3 and 4. The edge of the metal defining the aperture 12 is preferably fitted with a resilient annular element 20, the cross sectional shape of which is clearly shown in Fig. 6. This element 20 serves as a seal to facilitate the complete closure of the aperture by the cone, and as a bumper to prevent damage to the cone skirt as the skirt seats in the aperture.

As shown in Fig. 3, the area of the annular conical surface of the skirt 19 which projects outward and aft from the aperture 12 may be varied by either changing the maximum diameter of the skirt, or by changing the diameter of the aperture. This exposed skirt area will be predetermined in accordance with the air speed at which the refueling operation is to be performed, which in turn will be governed by the flight characteristics of the planes to be refueled.

If that portion of the airplane which forms the drag cone receiver is of gradually diminishing cross sectional area in an aft direction, and if the exposed surface area of drag cone is sufficient, as shown in Fig. 3, the air resistance or drag resulting from the flight of the supply plane through the air will be ample, when the reel 14 is released to rotate freely, to rapidly move the drag cone 16 and the attached end of the hose 13 into a trailing position in the air stream aft of the aperture 12. Thereafter, a cone of the design shown will hold the hose taut and practically stationary in the air with relation to the supply airplane, and approximately in the position shown in Fig. 1. Thus it is relatively easy for the pilot of the following airplane to nose a hollow probe 27 into the large end of the cone 16, and thus refuel his airplane. When refueling is completed the reel is rotated by a conventional power unit 26, such as an electric motor, and the hose 13 is reeled into the supply airplane until the cone 16 is seated in the receiver, as shown in Fig. 3. The reel is then locked against reverse rotation, and the cone is thus held in its seat until the next refueling operation starts.

A modification of the cone and receiver combination is illustrated in Fig. 4. In this case the receiver 21 is fitted exteriorly with a ring-like air scope 22 conforming generally in cross sectional shape to the cross sectional shape of the receiver 21, but spaced outwardly therefrom, as shown. The mounting is accomplished by a plurality of circumferentially spaced angle brackets 23, the cross sectional shape of which is shown in Fig. 5. The forward end of the scoop 22 is sufficiently large to extend outward into the air stream flowing along the exterior surface of the receiver 21 during flight. The remaining portion of the scoop is smaller, and is shaped to direct air against the exposed surface of the cone 16. The scoop thus produces a decided increase in the air forces tending to move the cone aft into the airstream, as will be understood by those familiar with this art. By providing an air scoop of this type it is unnecessary for that portion of the airplane which forms the drag cone receiver to be of diminishing cross sectional area in an aft direction.

Those familiar with this art will understand that any desired component part of the airplane, such as an engine nacelle, for instance, may be adapted to serve as a cone receiver, as illustrated in Fig. 2.

Having described the invention with sufficient clarity to enable those familiar with this art to construct and use it, we claim:

1. Apparatus for transferring fuel from a supply airplane carrying fuel supply tanks to another airplane, during flight, comprising: a substantially circular aperture formed in the aft end of a fore and aft disposed component part of the supply airplane; a power operated hose reel carried in the supply airplane; a fuel transfer hose carried by the reel and adapted to be let out of the airplane through said aperture, one end of said hose being in communication with said fuel supply tanks; and a frusto-conical air drag unit or cone having an axial fuel transfer passage therethrough, attached to and in communication with the other end of said hose, the larger end of the cone being disposed rearwardly with relation to the airplane, the diameter of the larger end of said cone being greater than the diameter of said aperture, whereby the aperture serves as a receiver and holder for said cone when the hose is reeled in taut, and the cone serves as a closure for said aperture.

2. The invention described in claim 1, and a resilient annular seat affixed to the edge of said aperture.

3. Apparatus for transferring fuel from a supply airplane carrying fuel supply tanks to another airplane, during flight, comprising: a fore and aft disposed hollow fairing of rearwardly diminishing cross sectional area constituting a component part of the supply airplane; a substantially circular aperture formed in the aft end of said fairing; a power operated hose reel carried in the supply airplane; a fuel transfer hose carried by the reel and adapted to be let out through said aperture, one end of the hose being in communication with said fuel supply tanks; and a frusto-conical air drag unit having an axial fuel transfer passage therethrough, attached to and in communication with the other end of said hose, the large end of the cone being disposed rearwardly with relation to the fairing, the diameter of the base of said cone being considerably larger than the diameter of said aperture, whereby the aperture serves as a receiver or holder for said cone when the hose is reeled in taut, and the cone serves as a closure for said aperture and extends annularly into the air stream around said aperture, the surface area of the annular exposed portion of the cone being sufficient that rearward pressure created by air flowing along the exterior surface of said fairing will move said cone and the attached hose into the air behind said fairing when the hose reel is freed.

4. The invention described in claim 3, and an annular air scoop carried by said fairing adjacent said aperture for directing airflow against the annular exposed portion of said cone.

5. The invention described in claim 3, and a resilient annular seat affixed to the edge of said aperture.

6. In airplane flight refueling apparatus which includes a flexible element attached to and adapted to be let out and trailed behind a supply airplane for making contact with another airplane, a frusto-conical air drag unit attached to the trailed end of said flexible element; a substantially circular aperture in the aft end of a fore and aft disposed component part of said supply airplane, said aperture constituting a seat for said drag unit when the flexible element is drawn into the supply airplane, and said drag unit simultaneously serving as a closure for said aperture; and a gasket type sealing element secured to one of the mentioned elements affording a continuous seal between them when the drag unit is seated in said aperture.

7. A combination of elements such as described in claim 6 in which the said sealing element is affixed to the drag unit seating edge of said aperture.

8. In airplane flight refueling apparatus which includes a flexible element attached to and adapted to be let out and trailed behind a supply airplane for making contact with another airplane, a fore and aft disposed component of substantially circular cross sectional shape carried by the supply airplane; a circular aperture in the aft end of said fairing through which said flexible element may be let out; a frusto-conical air drag unit attached to the trailed end of said flexible element, the diameter of the larger end of said drag unit being larger than the diameter of said aperture, said aperture constituting a seat for the drag unit when the flexible element is drawn into the supply airplane, and said drag unit also constituting a closure for said aperture; and an air scoop mounted near the aft end of said fore and aft disposed component for directing rearward airflow against an exposed portion of the air drag unit when the latter is seated in said aperture, said scoop constituting a means of boosting the drag unit aft into the air as the flexible element is let out from the supply airplane.

9. The invention described in claim 8, and a resilient annular sealing element affixed to the drag unit seating edge of said aperture.

ROBERT L. WILLIAMS.
ALVIN FLOYD LAMMERS.
HAROLD W. ZIPP.

REFERENCES CITED

The following references are of record in the file of this patent:

UNITED STATES PATENTS

| Number | Name | Date |
|---|---|---|
| 2,426,635 | Mercier | Sept. 2, 1947 |
| 2,432,078 | Adler | Dec. 9, 1947 |

OTHER REFERENCES

"Aviation Week," Magazine, Aug. 29, 1949, pp. 18–20.